April 3, 1934.                H. D. TAYLOR                 1,953,319
                                CAR TRUCK
           Filed Feb. 6, 1930              2 Sheets-Sheet 2
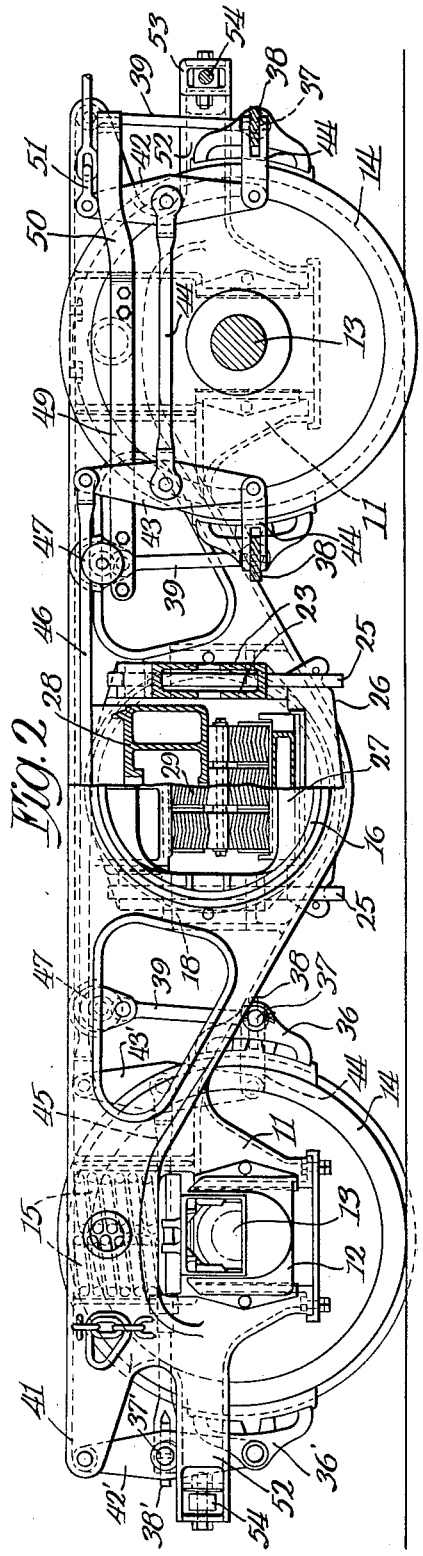
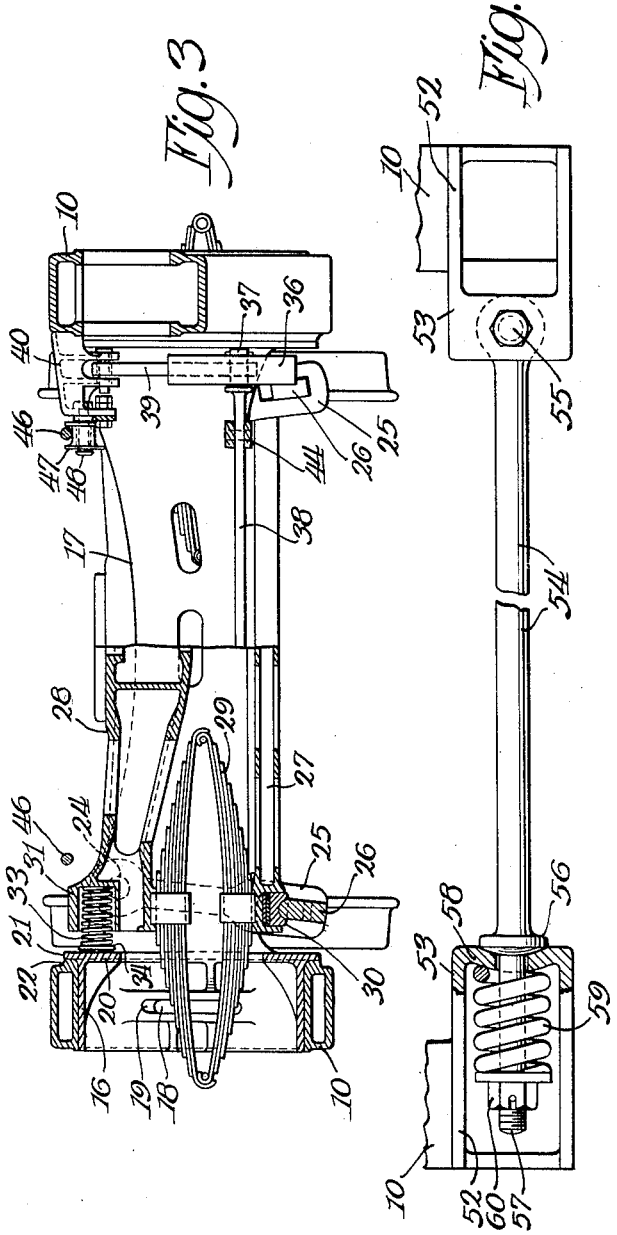
Inventor
Howard D. Taylor
By Fisher, Clapp, Soans & Pond
Attys.

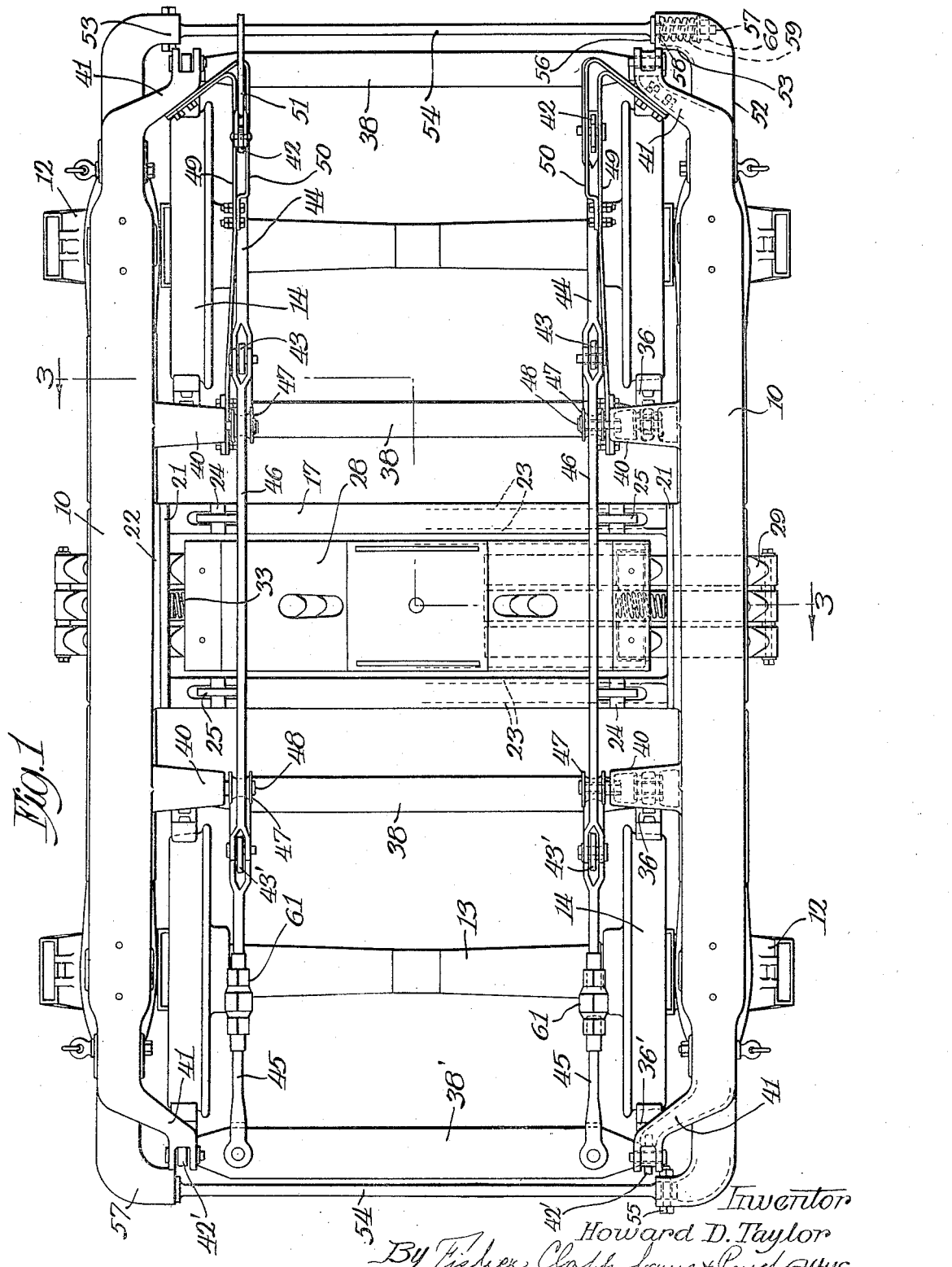

Patented Apr. 3, 1934

1,953,319

UNITED STATES PATENT OFFICE 1,953,319

CAR TRUCK

Howard D. Taylor, New York, N. Y., assignor to Flexible Truck Corporation, Reading, Pa., a corporation of Delaware Application February 6, 1930, Serial No. 426,277

5 Claims. (Cl. 188—56)

The invention relates to car trucks and seeks to provide an improved truck of the type in which the side frames are flexibly mounted or journaled upon the transverse connecting means or truck transom to permit the independent relative rocking movement of the side frames. Further objects are to provide an improved brake rigging and improved supporting means therefor, which, in its preferred embodiment, is particularly adapted for flexible trucks.

With these and other objects in view, the invention consists in the features of improvement hereinafter set forth, illustrated in the preferred form in the accompanying drawings, and more particularly pointed out in the appended claims.

In the drawings:

Fig. 1 is a plan view of the improved truck.

Fig. 2 is a view partially in elevation and partially in longitudinal section.

Fig. 3 is a view in transverse section on the line 3—3 of Fig. 1.

Fig. 4 is a detail view of the end connection between the side frames.

The truck side frames 10 are provided at their ends with pedestal yokes 11 for engaging the journal boxes 12. The latter, as usual, engage the journals on the ends of the axles 13 of the wheels 14. Supporting springs 15 arranged within pockets in the ends of the side frames rest upon the journal boxes. The enlarged central portions of the side frames are provided with bearing openings which receive large hollow journal members 16 which form the enlarged ends of the truck transom 17. Keys 18 fixed within pockets in each side frame on opposite sides of its bearing opening, engage slots 19 in the opposite sides of the corresponding journal member 16, and thereby connect the side frames and transom in a manner permitting the limited independent rocking movement of the side frames.

The truck transom is provided at the inner end of each journal with a transverse web 20 which extends inwardly from the journal wall and also projects outwardly beyond the periphery of the journal to form a shoulder 21 which abuts against a bead 22 formed upon the inner face of the side frame about the bearing opening therein. The main body of the transom between its end journals comprises side walls 23, each of which is double or of hollow box section, as most plainly shown in Fig. 2. At the upper edges of the side portions, the side walls of the transom are provided with seats for the pivot pins 24 of hangers 25 which extend downwardly through openings in the top and bottom of each transom side wall and between the spaced sides thereof. At their lower ends, the hangers carry cross bars 26 which engage the ends of and support a spring plank 27. A bolster 28 and bolster springs 29 are disposed between the side walls of the transom. The springs are preferably elliptical and extend transversely of the truck with their outer ends projecting into hollow journal members 16 of the truck transom.

The rounded upper edges of the cross bars 26 engage shoes 30 disposed within seats in the ends of the spring plank, the arrangement being such that the hangers are inclined outwardly to a slight extent from their upper pivoted ends to their lower ends. Hence, the load on the truck bolster tends to center it between the side frames while permitting the limited transverse movement of the bolster and the car body carried thereby. To aid in centering the bolster, it is provided at its ends with pockets 31 for receiving coil springs 33. The latter carry buffer plates 34 (see Fig. 3), and these plates engage the transverse webs 20 at the ends of the transom and so cushion the transverse movement of the bolster and aid in centering it.

The brake mechanism is preferably of the clasp type and the brake heads 36, except at the outer end of the truck, are mounted on trunnions 37 formed upon the ends of transverse brake beams 38. These brake beams, except at the outer end of the truck, are supported at their opposite ends by hangers 39 having their lower ends pivotally engaging the trunnions 37 and their upper ends pivoted to lugs or brackets 40 and 41 on the adjacent side frame. The side frame is preferably formed of cast metal and the lugs or brackets 40 are cast integrally therewith and project inwardly from the upper portions of the side frame at points between the center and ends of the frame. At its upper portion and at its ends, each side frame is provided with inwardly offset lugs or brackets 41 to which the hangers 39 at the forward or inner end of the truck are pivoted.

At the outer or rear end of the truck, the brake heads 36' are pivotally mounted directly on the lower end of brake levers 42' which in turn are pivoted at their upper ends to the inwardly offset projections 41 of the side frames at this end of the truck. The brake beam 38' at this end of the truck, extends between the brake levers 42' and the latter are pivoted intermediate their ends on the trunnions 37' of this brake beam.

The remaining levers 42, 43 and 43' are floating levers and are pivotally connected at their lower ends to fulcrum members 44 having jaws that engage and are rigidly secured to the brake beams 38.

The pair of opposed levers 42 and 43 associated with each wheel at the inner or forward end of the truck, are connected together intermediate their ends by a pull-rod 44 and each brake lever 43' is connected at a point intermediate its ends by a pull-rod 45 to the brake beam 38', this pull-rod having a jaw which embraces and is rigidly secured to the beam 38'. The inner brake levers 43 and 43' at each side of the truck are connected at their upper ends by a pull-rod 46 and this pull-rod and the brake levers connected thereto are guided and supported on the side frame by means permitting their movement in longitudinal direction in applying and releasing the brakes. In the preferred embodiment shown, each rod 46 is supported on a pair of rollers 47 which are mounted on pintles or studs 48 that are fixed to and project inwardly from the ends of the side frame lugs or brackets 40. To prevent displacement of the rods, the guide rollers 47 are grooved or provided at their ends with flanges.

The brake levers and connecting pull-rods at each side of the truck are disposed in a plane inside the car wheels and means fixed to the side frame and extending around the adjacent wheel is provided for supporting and guiding the brake lever 42 at the inner or forward end of the truck. This supporting guide comprises metal straps 49 and 50, the strap 49 being bolted at one end to the bracket 40 and having an offset inclined opposite the end portions which is bolted to the offset projection 41 of the side frame at the adjacent end of the truck. The strap 50 is similarly bolted at one end to the projection 41 and its opposite end is secured to the strap 49 intermediate its ends. The longitudinally extending portions of the straps 49 and 50 are spaced apart and embrace and hold the adjacent brake lever 42 against lateral displacement. A clevis 51 or other suitable form of connection for a pull-rod is connected to the upper end of each brake lever 42 and engages the upper edges of the guide straps 49 and 50 to support the brake lever and parts connected thereto. These edge portions of the straps as shown in Fig. 2, are inclined or curved on an arc substantially concentric with the pivot at the lower end of the brake lever, so that the latter and parts connected thereto are not improperly displaced during the longitudinal swinging movement of the lever. By means of pull-rods or other connecting devices, the upper ends of the levers 42 are connected to the means employed, such as a brake cylinder or cylinders, for applying the brakes. These parts, as usual, can be connected to a radius bar for equalizing the braking pressure on the wheels at opposite sides of the truck.

Flexible connections are provided between the ends of the truck side frames which will not interfere with their independent rocking movement in passing over irregularities in the track, but which will brace the side frames and aid them in resisting the application of the braking pressure. For this purpose, the central end portions of the side frames are provided with horizontal extensions 52 having inturned offsets 53 at their ends that are connected to transverse brace members or rods 54. Each rod is provided at one end with an eye which extends within a pocket in the offset 53 of one of the side frames and is connected thereto by a horizontal pivot bolt 55. At its other end, the rod is provided with a flange 56 and an extension 57. The flange 56 has a convex face that engages a concave seat in the end wall 58 of the side frame offset 53 and the extension 57 extends loosely through an opening therein. A spring 59 is coiled about the extension 57 and is interposed between a collar thereon and the end wall 58, an adjusting nut 60 being provided for the spring. These flexible end connections brace the side frames without interfering with their independent movement in vertical planes. The brake rigging is so supported from the side frames that it does not interfere with their rocking movement and is not improperly displaced by such movement. The connections between the brake levers are disposed above the wheel axles so that the brake rigging need not be disturbed in order to remove the wheels and axles.

The brake rigging at each side of the truck is provided with a single fulcrum point and a single point for the application of power at the upper ends respectively of the brake levers 42' and 42 at its opposite ends. With this arrangement, a single, simple means may be provided for adjusting the brake rigging at each side to compensate for the reduction in size of the wheels as they are ground down. For this purpose, the connecting rod 45 between the fulcrumed brake lever 42' and the companion brake lever 43' is provided with a turnbuckle 61, and the leverage is such that by this single means the position of the brake heads can be readily and quickly adjusted.

Changes may be made in the details set forth without departure from the scope of the invention as defined in the appended claims.

I claim as my invention:

1. In combination in a car truck, a side frame and a supporting wheel therefor, said frame having lateral offsets in front and rear of the wheel, brake beams hanger-supported from said offsets, a pair of opposed brake levers connected together intermediate their ends and connected to said brake beams at their lower ends, pull-rods connected to the upper ends of said levers, a grooved guiding and supporting roller mounted on one of said offsets and engaging one of said pull-rods, guide bars for the other pull-rod connected to said offsets, disposed inside of the wheel and supporting and guiding the associated brake lever.

2. In combination in a car truck, wheel axles and wheels, clasp brake hangers, a set of vertically disposed brake levers and operating pull rods at each side of the truck and disposed inside of the plane of the wheels, separate, flexibly connected side frames outside of the wheels and having short, inwardly offset lugs adjacent their upper edges and in front and rear of each wheel and whereon said brake hangers are pivotally supported, and supporting guides for the brake levers and pull rods mounted on the inner ends of said offset lugs and engaging the pull rods adjacent the upper ends of the brake levers, substantially as described.

3. In combination in a car truck, wheel axles and wheels, separate, flexibly connected side frames disposed outside of said wheels and having short, inwardly offset lugs adjacent their upper edges and in front and rear of each wheel, a pair of vertically disposed clasp brake levers associated with each wheel and connected intermediate their ends, pull rods connecting the upper ends of the intermediate levers, operating members connected to the upper ends of the live end levers, the dead end levers being pivotally supported on the inwardly offset lugs at the adjacent ends of the side frames, and supporting guides mounted on the other offset lugs, disposed inside of the plane of the wheels and engaging said pull rods and operating members adjacent the upper end of the intermediate and live end levers, substantially as described.

4. In a car truck, wheels and wheel axles, flexibly connected side frames disposed outside of the wheels and having short, inwardly offset lugs adjacent their upper edges and in front and rear of each wheel, brake beams on opposite sides of the wheels, brake beam hangers pivotally supported on the inwardly offset lugs of the side frames and disposed in the plane of the wheels, the hangers at the dead end of the truck constituting brake levers and connected to the associated beam intermediate their ends, a set of intermediate and live end brake levers at each side of the truck and disposed inside of the plane of the wheels, pull rods connecting said live and brake levers together and to the dead end brake beam, and supporting guides mounted on the inwardly offset lugs of the side frames and engaging certain of the pull rods adjacent the upper ends of the intermediate and live end brake levers, substantially as described.

5. In combination in a car truck, a side frame and a supporting wheel inside of said frame, a pair of opposed brake levers connected intermediate their ends and disposed inside of said wheel, oppositely disposed pull rods connected to the upper ends of said levers, and supporting guides engaging said pull rods adjacent the upper ends of said levers, one of said guides being connected at its ends to inwardly projecting offsets on the side frame, extending inside of the wheel and having a slotted inclined portion engaging the adjacent pull rod and through which the upper end of one of said levers extends, substantially as described.

HOWARD D. TAYLOR.